March 31, 1970  R. L. DE MONTEBELLO  3,503,315
INTEGRAL PHOTOGRAPHY

Filed Dec. 12, 1966  4 Sheets-Sheet 3

INVENTOR
Roger Lannes de Montebello
BY
ATTORNEYS

March 31, 1970   R. L. DE MONTEBELLO   3,503,315
INTEGRAL PHOTOGRAPHY
Filed Dec. 12, 1966   4 Sheets-Sheet 4

INVENTOR
Roger Lannes de Montebello
BY
ATTORNEYS

United States Patent Office 3,503,315
Patented Mar. 31, 1970

3,503,315
INTEGRAL PHOTOGRAPHY
Roger Lannes de Montebello, New York, N.Y., assignor to Joseph Lucas (Industries) Limited, Birmingham, England
Filed Dec. 12, 1966, Ser. No. 600,957
Int. Cl. G03b 35/24
U.S. Cl. 95—18                                          8 Claims

ABSTRACT OF THE DISCLOSURE

The invention provides a process for the production and display of a picture in panoramic stereoscopic relief, as distinguished from pseudoscopic relief, and which is a very wide-angle summation image of a scene. This summation image, as perceived, is three dimensional and orthoscopic in both horizontal and vertical axes and is directly visible in virtual space beyond and through its transparent support, an integral, spherilenticular network. The process restores fully natural binocular vision, offering widely variable perspective and aspect changes and complete masking and unmasking of objects by other objects, according to the distance and angle of observation, exactly as is the case in the presence of an actual scene, without any artificial compression of the Z or depth axis, and without the phases or shifts, pseudoscopic zones or repeat images found in the prior art.

BACKGROUND OF THE INVENTION

A direct vision stereoscopic system employing cellular elements was originally suggested by Lippmann, as described for example in Académie des Sciences, Comptes Rendus, 146, 1908, pp. 446–451, and in the March 1932 Journal of the Optical Society of America, vol. 21, pp. 171–176. While elegant in concept and potentially striking in results, this system of Professor Lippmann presented numerous technical difficulties which have led researchers away from its original cellular form. Thus it was found that replacing the cellular elements by linear elements (networks of transparent lines or cylindrical lenses often referred to as "Parallax Panoramagrams") greatly simplified the problems presented by the original form. This modification, however, based on H. E. Ives' original proposition presents its own problems which have seriously limited its utility. Among these problems are the necessity of using a separate camera lens, dynamic or very large, or several static lenses, the inherent smallness of the field angle causing repeat or "jump back" of the summation image, separated by pseudoscopic and double image zones or, where a wider viewing angle is desired, (viewing angle, field angle, acceptance angle are herein taken as equivalent expressions) the ensuing flattening of the Z or depth axis.

The present invention is concerned principally with providing an efficient and workable system employing the original Lippmann integral photography concept.

With the integral photographic apparatus disclosed by Lippmann, and those later proposed by Ives, Estanave and others, a photographic record of a field is produced directly on an emulsion by a lenticular or pinhole network. This record consists of a group of discreet, non-overlapping, minute images, each being an image of all or a major portion of the field. When the photographic record of the field consisting of the group of independent images on an emulsion, is developed and chemically reversed (converted into a positive), and is then lighted from the "back" by a more or less diffuse luminous surface, there is projected in space a summation or integral real image of the field; the image is projected through the spherical lenses forming the front of the elemental cells. In this summation or integral real image, convergence (intersection) points occur naturally at locations corresponding precisely to the locations of the object points in the original field. This summation image is seen by the observer as "pseudoscopic" because the eyes have to be located in the object space in order to see through the lenses. For the integral image to be converted to stereoscopic instead of pseudoscopic, each minute image would have to be individually geometrically reoriented. To achieve this reorientation, some devices have been proposed (e.g. Lassus St. Genies). All of these use an additional camera lens or mirror but this additional image-forming device, even when it is very large, limits the acceptance angle and therefore defeats the purpose of obtaining a single, wide-angle, ever changing summation image. A direct exposure system, involving no extra lens, was suggested by Lippmann. But this was solely as a means of obtaining positives, since he was apparently unaware of the pseudoscopic phenomenon. It consisted of exposing a second lenticular plate to the initial one at some, preferably close, arbitrary distance. As proposed, however, this method is not satisfactory: depending upon the location, in the virtual object space, of the second plate, the field and angle of view of the stereoscopic virtual image and its spatial relationship with the second plate change so much that if the second plate is exposed while located, say, midway within the virtual object, one half of the new summation stereoscopic image is visible behind the plate and is virtual, and the other half of it extends in front of the plate and is real, which tends to cause an unnatural appearance of motion and cut-off at the edges of the plate. Furthermore, the original acceptance angle of the first plate is substantially and unacceptably reduced in the second plate. On the other hand, when the second plate is relocated close enough to the first plate so that the angle of view will not be exaggeratedly reduced, the first plate's lenticular elements break up the elemental images of the second plate into discreet components, which become visible in the summation image as a disturbing moire.

OBJECTS

A principal object of the present invention has been to provide a practical and efficient integral photography system which overcomes the disadvantages of the prior art.

In particular it is an object of the invention to provide a wide angle integral photography system in which the elemental images of the field are individually and efficiently geometrically reoriented without loss of field angle and so that a stereoscopic summation image can be produced.

Another object of the invention is to provide, in a wide angle integral photography system comprising a lenticular plate whose image-forming structure is of the cellular type and is capable of forming autonomously a multiplicity of independent and non-overlapping elemental images of at least a large portion of a field on a photographic emulsion, means for producing from the developed set of images a new set of images where the geometric orientation of each individual image is reversed relative to the initial corresponding image of the first set; these means do not include any optics other than integral networks. When the developed set of the thus reoriented elemental images is coupled in register to a similarly spaced lenticular plate, the summation in space of elements from each individually reoriented elemental image is stereoscopic instead of pseudoscopic and therefore is virtual and behind the plate rather than real and in front of it, when viewed from the front or image-forming side and presents continuously changing aspects and perspectives in all directions, vertical as well as horizontal, as the observer moves before the plate within the wide acceptance angle of the plate. Beyond this angle the image is not repeated but simply ceases to be visible.

Another object of the invention is to provide a wide angle lenticular structure constructed so that the elemental image reorientation can be accomplished without impractical problems of register. Within limits which are a function of the maximum acceptable loss of sharpness of the summation image and of the resolving power in each elemental image, the center-to-center (pitch) distance between individual elements (elemental images) may be made larger than the resolving threshold of the eye, due to the fact that the network is in a plane distinct from those contained in the space of the stereoscopic summation image and that, in viewing, the slightest lateral motion of the head, natural in the presence of a three-dimensional object (virtual or real), further blurs the screen pattern while the eyes converge and focus on the image beyond the network.

A further object of the invention is to provide a system of the foregoing type in which the angle of view is substantially identical to the taking angle, in order not to introduce any appreciable distortion due to disparity in taking and viewing angles.

Other and further objects, features and advantages of the invention will appear more fully from the following description.

SUMMARY OF THE INVENTION

The system and method of the invention involves three stages, a taking stage, a transposition or reorientation stage and a viewing stage. At both the taking and the transposition stage, the integral networks preferably include diaphragms and field apertures. In the taking stage there is produced an integral photograph or photogram of the field directly, without the help of any additional (non-integral) optics. The terms "photogram" as used herein means a photographic record of an optical field in which the photographic record consists of a multiplicity of independent and non-overlapping minute, elemental images each of which is an image of a large portion of the field.

In the transposition stage, the geometric orientation of each of the elemental images of the photogram is individually reversed. This reversal is effected without the help of any central focusing optics (lens or mirror) by locating the photogram, relative to the group of image-forming elements constituting a lenticular network, in a position such that each elemental image is aligned with a respective image-forming element or lenslet of the network in axial register and is disposed at one of the conjugate planes therefrom, locating a radiation-sensitive layer in a position roughly symmetrical to the photogram but on the opposite side of the lenticular network at the second conjugate plane, and thus exposing the radiation-sensitive layer to the photogram. In this way a new but corresponding group of elemental images is formed each of which is reversed 180° with respect to its corresponding image in the original photogram. However, the elemental images themselves are in the same positions relative to each other in both the original and the new photogram. The group of image-forming elements may be the same group used in the taking stage, but this is preferably not the case. Again it is to be clearly understood that the transposition is performed without the help of any additional or central optical element. In the viewing stage, the new photogram is associated in optical contact and in axial register with an integral network having, preferably, substantially no diaphragms. The new photogram may be transparent, and transilluminated for viewing, or it may be opaque with high reflectance, and viewed in ambient light.

When viewed through the lenslets the elemental images of the second layer produce a summation virtual image of the original scene which is three dimensional and orthoscopic and is directly visible in the virtual space beyond and through said third sheet of lenslets. By reason of the preferred complementary shapes of the film and the back surface of the integral lenticular network sheet of the invention, any slight contraction or expansion of the film sheet is rendered unobjectionable due to the conformation which occurs when the film sheet is pressed into contact with the surface of the lenslets. Larger contraction or expansion can easily be compensated for by respectively raising or lowering the RH in the area where the assembly is performed. Good coincidence between film and lenslets is then semi-automatically determined by mechanical rather than visual means.

One or more of the lenslet networks is provided with individual diaphragms for each of the lenslets and the same and/or another of the lenslet networks is provided with a field-limiting aperture sheet whereby the images formed by the several lenslets do not substantially overlap.

The process of the present invention results in an assembly for producing a wide-angle summation virtual image of a scene which is three dimensional and orthoscopic and is directly visible in virtual space beyond and through its transparent support which comprises a wide angle integral lenticular network having adjacent lenslets with spherically convex surfaces towards and away from the viewer (front and back), an image layer having spherically concave surfaces adjacent said back lenslets at substantially the focal surface of its respective front lenslet or closer, and in register therewith, said image layer, in the areas corresponding to the lenslets, bearing the wide-angle elemental images which differ slightly from each adjacent wide-angle elemental image, the left side of each image being of the left side of the reproduced subject.

In the viewing stage described above the elemental images may be, as stated, closer than the focal plane of the elements, because this plane, on account of the large aperture of the elements, has been in practice found not to be optimum for viewing, contrary to theory.

A major aspect of the invention lies in the fact that the only optics involved in the transposition (or reorientation) stage is a lenticular screen having the developed photogram at one conjugate surface and a photosensitive layer at the other.

An important aspect of the invention lies in the fact that the lenticular structures used in the taking and viewing stages can be substantially coarser than generally recognized by Lippmann and the other workers in the field, thus greatly minimizing problems of registry. By "coarser" is meant greater center-to-center spacing of adjacent lenticular elements and/or greater size of individual lenticular elements and elemental images. In determining a suitable spacing between elements' centers two contradictory factors must be considered. One of these factors is that the sharpness of the projected summation image is directly affected by the sharpness or the resolving power of the individual elemental components, the sharpness of each of which is in turn directly proportional to the elemental image size and hence to the center-to-center elemental spacing: naturally, more, smaller components of a scene will be resolved with larger elemental images. The second factor is that the increased conspicuousness of the screen caused by increased size of each elemental component decreases the sharpness of the projected image in proportion to the size of each elemental component at least for still monocular viewing. Since viewing is binocular, and usually not still, with focusing beyond the screen, a balance between these factors can be achieved with an elemental spacing substantially greater than the resolving power of the eye, and relatively coarse lenticular structures can be used, e.g., a center-to-center spacing of about 0.1" or more for relatively close viewing. Such coarse structures are easier to construct and easier to register than the fine screens usually suggested especially in view of the diaphragm and mask sheets which must be associated with the taking and/or transposing screens.

BRIEF DESCRIPTION OF THE DRAWINGS

The invention will now be described in greater detail in connection with the appended drawings, in which:

It will be understood that the elements shown in FIGURES 5, 6 and 7 are used with each other, the elements in FIGURES 8, 9 and 10 are used with each other, etc., and that FIGURES 5, 8, 14 and 17 are alternative to each other in carrying out the present invention, as are also. e.g., FIGURES 6, 9, 15 and 18.

FIGURES 17, 18 and 19 schematically illustrate a further modification of the invention, in which a single or identical lenslet sheet may be used for all three stages of the invention. In FIGURE 17, a flat sheet of film is shown as being exposed to the images formed by the lenslets of an integral lenticular network sheet. In FIGURE 18, a second flat sheet of film is exposed through the same or a duplicate lenticular network sheet with the developed film resulting from the operation of FIGURE 17 being at one of two conjugate planes and an unexposed sheet of film being at the other conjugate plane. This second sheet of film is developed and then viewed through the same or a similar lenticular sheet, as shown in FIGURE 19.

DESCRIPTION OF THE PREFERRED EMBODIMENTS

Figure 1:
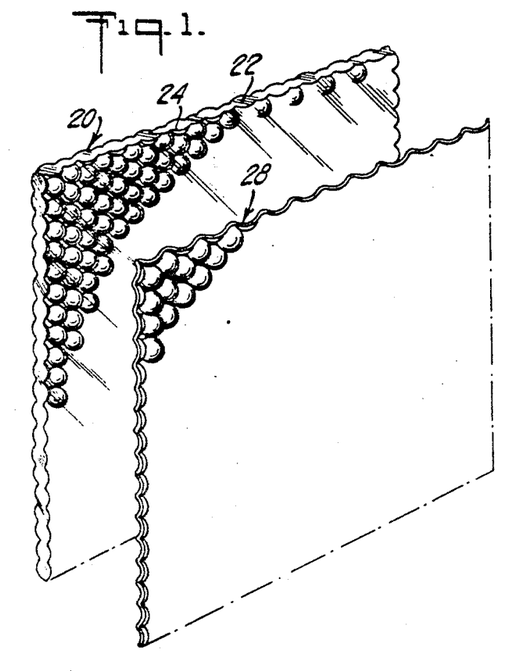
FIGURE 1 is a fragmentary, enlarged perspective view showing an integral lenticular network of closely packed lenslets and a sheet of radiation sensitive material embossed so that it may be fitted against and in close contact with one face of the lenticular network.
Figure 2:
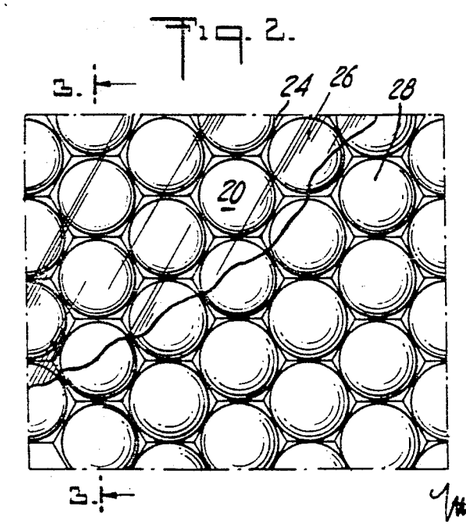
FIGURE 2 is a back-side elevation of the integral lenticular network sheet shown in FIGURE 1.
Figure 3:
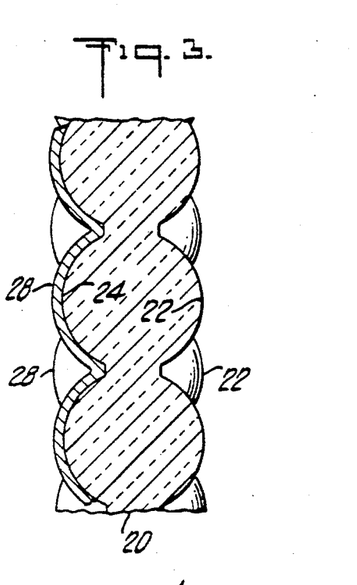
FIGURE 3 is a fragmentary cross sectional view taken on the line 3—3 of FIGURE 2, with a sheet of radiation sensitive material in contact with one face thereof, the lenslets being of a material having a high refractive index.
Figure 4:
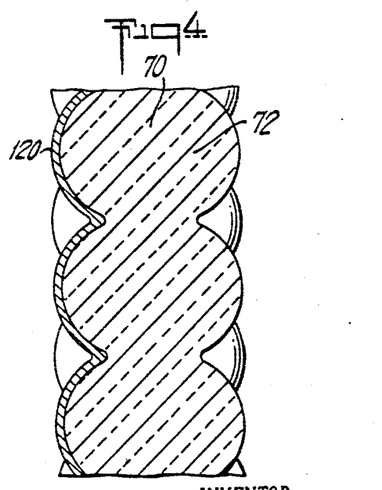
FIGURE 4 is a similar fragmentary cross sectional view of a portion of an integral lenticular network sheet, or screen having a lower index of refraction.

Referring now in detail to the present preferred and illustrative embodiment of the present invention;

FIGURES 1, 2 and 3 are fragmentary schematic views of elements used at the viewing stage of the process of the present invention. As shown, there is provided a sheet 20, preferably of a transparent, clear, uncolored plastic material, such as polystyrene or more preferably a transparent polyester resin having a refractive index of $n=1.56$ or more, which has its two faces 22, 24 formed as a closely packed network of small, uniform parti-spherical convex elements 26, the partial spheres on one side of the network sheet being in axial (though not necessarily concentric, this depending upon the refractive index) register with the partial spheres on the other side of the network sheet 20. While the packing may be square, it is preferably hexagonal or honeycomb pattern, as shown, which achieves a closer packing. The parti-spherical protuberances of the two sides of the network sheets are preferably substantially identical in size and shape. Each of the lenslets of one side at this viewing stage serves to magnify the image points recorded on the radiation sensitive layer 28 which is in close contact with the rear face of the lenslets, on the other side of this network sheet. Each magnified point thus substantially fills all of the area of its associated lenslet. Each lenslet therefor offers a density and/or color which corresponds to the density and/or color of the image point located on the viewing axis. The ensemble of these various densities and/or colors forms a summation image. As the observer moves, the point being magnified by each lenslet changes. So does the tone and/or color of the lenslet filled by the magnified point, and therefore the whole aspect of the summation image also changes, as is well known.

While various radiation sensitive materials may be used in practising the process of the present invention, such as those sensitive to ultra-violet and infra-red light, the process of the present invention is generally carried out using light-sensitive materials, preferably color negative materials such as Ektacolor® for the first exposure and positive color material such as Ektacolor® print film for the second exposure, or alternatively reversal color material such as Ektachrome®, at both stages, or black and white material at both stages.

For use in the process of the present invention, at least the radiation sensitive film exposed at the second stage and viewed at the third stage is deformed and embossed by being subjected to pressure between male and female dies accurately reproducing the lenticular network sheet with which the film is to be used except in that the female has preferably a radius larger than the male die by the thickness of the film.

As an example, to accomplish the embossing, a sheet of Ektacolor® print film is stored from 20 minutes to one hour in an atmosphere having a relative humidity of 60-75% at a temperature of 73° F., after which the sheet of film is distorted and embossed beween male and female dies, at a pressure of about 1200 to 2000 p.s.i. for a period of from about one second with a die temperature of 100°–150° F.

Thereafter the film is promptly removed from the dies care being taken not to warp it, thereby rendering it ready for exposure.

Of course, all of the operations on the film prior to exposure must be carried out in the dark so as to prevent unwanted pre-exposure or fog of the sensitive material on the film.

Careful calculations and control of the above parameters results in the film and the film's emulsion being substantially unaffected by the embossing operation insofar as sensitometric characteristics are concerned.

In all of the optical elements used in carrying out the process of the present invention, the radii of curvature of the lenslets in the lenticular network are adjusted to the index of refraction of the material, usually a transparent thermoplastic or thermoset material, so that the images formed by the lenslets at the first and second stages are approximately focused, the criticality of the image resolution being sometimes a matter of compromise. The higher the refractive index, the wider the potential acceptance and viewing angle, in view of the fact that, with a higher index, the focal length becomes shorter for the same radius of curvature. At the third or viewing stage, the adjustment is made such that the summation image is the sharpest for a selected depth of field, the close objects represented being sharper with shallower lenslets, while the farther objects are sharper with deeper lenslets i.e. at or near the true focal length.

The many lenslets of the lenticular network sheet are preferably of identical dimensions and radii of curvature. Preferably, the individual lenslets are relatively small, although they need not be as small as may be visually resolved by the human eyes. Typically, the pitch or spacing of the individual lenslets for a picture 11" x 14" may be about 0.1". A smaller, or pocket size picture such as 4" x 5" could have the same total number of lenslets with a pitch of 0.04", provided that the resolving power of the film were sufficient to record the desired information on the smaller image areas. Larger pictures could have a correspondingly larger pitch for their lenslets.

In each of the exemplary modifications of the process of the preent invention, for the reproduction of a three-dimensional scene, a sheet of radiation-sensitive film is exposed to the images of the scene formed by a lenticular network of minute lenslets. The exposed film is then developed or otherwise processed to render the images useful, after which the developed exposed film is copied on another sheet of film with a lenticular network of minute convex lenslets positioned between them so that the several elemental images on the first film may be individually inverted and recorded in focus on the second sheet of sensitive film. The second sheet of film is then developed or otherwise processed to render the images visible, and is then positioned in register with a third lenticular network corresponding to the embossment of the second film so that the assembly may be binocularly viewed by light, preferably diffuse, transmitted or reflected by the developed second film and through the lenticular network, producing the wide-angle summation virtual image which is three dimensional and orthoscopic and is directly visible in virtual space beyond and through the transparent lenticular network.

Figure 5:
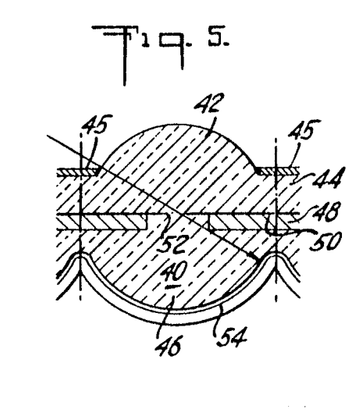
FIGURES 5, 8, 14 and 17 are schematic fragmentary cross-sectional views showing modifications of the elements and their arrangement during the first exposure of the first radiation sensitive layer as the first step in the process.
Figure 6:
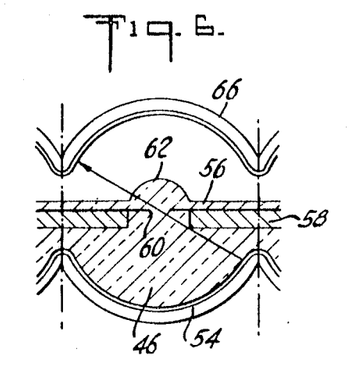
FIGURES 6, 9, 15 and 18 are similar alternatively schematic fragmentary cross-sectional views showing a developed image bearing layer derived from the first exposure in register with a lenticular sheet at one of the latter's conjugate surfaces while the other face of the lenticular sheet is in register with an unexposed, embossed sheet of radiation sensitive material at the second conjugate surface for exposure of the sheet to form the images to be viewed by the observer.
Figure 7:
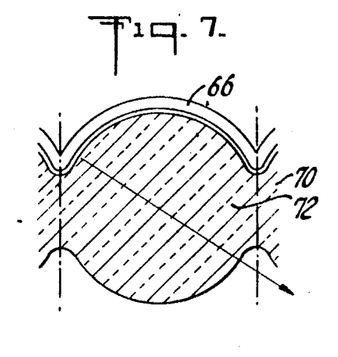
FIGURES 7, 10, 16 and 19 are similar views showing fragments of alternative viewing lenticular network sheets, each with a developed sheet bearing the elemental images closely fitted to the lenslets of the viewing sheet, and in a condition to be observed through the lenslets of the lenticular network sheet.

FIGURES 5, 6 and 7 illustrate in fragmentary schematic views, the successive steps in carrying out one of the methods of the present invention.

In FIGURE 5 is shown in greatly enlarged form, a cross-sectional view of a single lens element 40 of an integral lenticular network sheet extending laterally in all directions from the element shown, each lenslet being formed by minute portions of two superimposed, registered sheets, which may be integrated, the many lens elements 40 being hexagonally arranged. The upper portion of the lens element 40 is formed as a plano-convex lenslet 42, in concentric register with lenslet 40. The lenslet 42 is joined to the adjacent lenslets of the same side by interstices 44.

The interstices between adjacent lenslets 42 are preferably provided with opaque masking surfaces 45, so as to prevent extraneous light and flare from reaching the film 54. Also there are provided field limiting masks, as described in detail below.

The lower portion of the lens element 40 is formed as a plano-convex lens element 46. Between the upper and lower lenslets 42 and 46 is positioned a sheet 48 preferably of metal, having parallel faces, one face being in the plane of the nodal points of the lenslets and being provided with diaphragm apertures 52, each of which is concentrically registered with its respective lenslet 42, the other face being provided with field limiting apertures (not shown).

In intimate registered contact with the back-side of the lenticular network sheet is a sheet of radiation sensitive film 54, suitably embossed to fit closely to and register with the convex surfaces of the lenslets 46 with the sensitive or emulsion layer adjacent to the surface of the lenslets 46.

The radiation sensitive film may have a layer which is sensitive to infra-red, visible or ultra violet radiation and which is adapted to produce, after processing monochrome (black and white) negative or positive images or, color negative or reversal images. (Where a monochrome or color negative film is used, the subsequent exposure will be on sensitive film to produce a corresponding positive transparency, while if reversal film is used for the first exposure, it will be reproduced on reversal material in black and white or color, as the case may be, for transmitted or reflected illumination viewing.)

The next operation (the transposing or printing stage) constitutes the most important aspect of the invention.

After processing, the exposed film 54 is positioned in register with the lenticular network sheet used for the transposing stage, as shown in FIGURE 6. Lenslets 46 of FIGURE 6 are identical or the same as in FIGURE 5, or slightly larger or smaller in size and pitch to accommodate the dried processed film 54 which is positioned against this convex surface with the image-bearing emulsion layer in contact with the surface of the lenslet 46.

On the flat, plano face of the lenslets 46, is positioned a sheet 56 having a plane surface on which is mounted an opaque layer 58 having diaphragm apertures 60, and on its other face a series of convex lenslets 62, the lenslets 46 and 62 and the apertures 60 all being in concentric register with each other. The thickness of the sheet 56 and the radius of curvature of the lenslets 62 will be adjusted, taking into account the index of refraction of the transparent materials and the lenslet 46 so that the images on the film layer 54 may be brought into proper register and focus with the film layer 66 on which the images are to be transposed as inverted or mirror images. In other words, films 54 and 66 lie respectively in the two conjugate surfaces of lenslets 62. On the other face of layer 58 are field limiting apertures. A second sheet having symmetrical field limiting apertures may be adjacent sheet 58.

The film 66 with its many spherically concave embossments positioned towards the lenslets 46 and properly spaced therefrom and with its sensitive emulsion surface towards the lenslets is then exposed by illumination through the film 54. the image areas of the film 54 and the sensitive surface of the film 66 being at conjugate surfaces of the lenslets, so that the images are accurately reproduced on the sensitive surface areas, and subtending an angle such that, when the second film is, after development, optically associated with the third or viewing network, the rays of light from said film's elemental images form, beyond the nodal points of said third network and towards the observer, substantially the same angles as were initially formed by the corresponding rays from the scene at the nodal points of the lenslets of the first or "taking" network.

After exposure, the film 66 is removed and processed to reveal its images and then is positioned against the far side of the lenticular surface of a viewing lenticular network sheet 70 with the concave image-bearing portions of the film 66 in close, intimate and registering contact with the rear convex surfaces of the viewing lenslets 72 forming the lenticular network sheet 70. This sheet 70 has lenslets of such size and pitch that this film 66, after proper humidification or dehumidification can be made to conform without excessive stresses. Usually, the film is transparently cemented to the lenticular surface of the network sheet 70.

For viewing, the assembly of the image-bearing film 66 and the lenticular sheet 70 is preferably illuminated by a light-diffusing sheet (not shown) which may be positioned on the far side so that the film images are viewed through the lenslets 72.

The acceptance half-angle of the lenslets 42, that is the angle formed by one edge of the back lenslet 46 interstice or the film interstice, the principal point, which is also the center of curvature, and the axis of the lenslet, is limited by the field limiting mask elements 45 and/or 48 so that an image formed by any one of the lenslet assemblies 40 on the film 54 does not overlap the image formed by the adjacent lenslets. And, the same is true with respect to the lenslets 46 and 62. The lenslets 72 of the viewing stage, while having no field limiting masks, are so proportioned that the eyes cannot see in focus the images of neighboring lenslets.

The masks of the taking and printing networks are preferably generally hexagonal, for the type of network having a honeycomb formation of lenslets, so that images are mutually tangent and that, together, they fill substantially all of the film area.

The masks have inwardly curved hexagonal sides so proportioned that their projection onto the film fills each image cavity up to the rim and to the center line of the interstices, in order that each image be contiguous on all six sides with the surrounding images. The masks of the taking network are straight hexagons in the embodiments where the taking film is flat.

This latter function is important for the tone quality of the final summation image for the following reason: it is difficult to achieve a perfectly sharp delineation between the lenslets of the viewing screen. Therefore, since their interstices have a finite radius and consequently a finite width, and since they are transparent, their tonal aspect corresponds to the film's interstices seen through them. The dark areas for instances, are degraded by light interstices. A solution to this is to use reversal film, where the unexposed areas, therefore the interstices, remain dark ($D_{max}$). But this, unfortunately, while helping the dark zones, degrades the light zones where the network of interstices becomes dark and more visible and, of course, darkens the light zones. The use of the inwardly curved hexagonal masks permits, by causing contiguous images, to obtain dark interstices next to dark sub-image areas and light ones next to light sub-image areas, which results in not only an improved overall tone reproduction but in a less conspicuous screen network.

In order to minimize vignetting (which causes either overlap or gaps between images), more than one mask must be used, at least at the printing stage, preferably one mask in the object space and one in the image space.

The interstices between lenslets in viewing networks as shown are, as mentioned above, pronounced, because they have a finite width. The reason for this finite width lies in the fact that the radius of the lenslets is equal to one-half of the spacing between lenslets. In order to reduce the width and therefore the importance of these interstices without loss of field angle (viewing angle), a material having a somewhat higher refractive index than indicated above would have to be used, whereby the radius of curvature of the formed lenslets could be increased enough so that the surfaces of the lenslets would intersect at such an angle as to form only a fine line. Naturally, this presupposes that the spacing is not increased. For example, in the network shown in FIGURE 13, the refractive index is 1.56. An improved front curvature could be obtained with an index of 1.61 or 1.64, the radius of curvature passing from .047" to .052" and .054" respectively.

Figure 8:
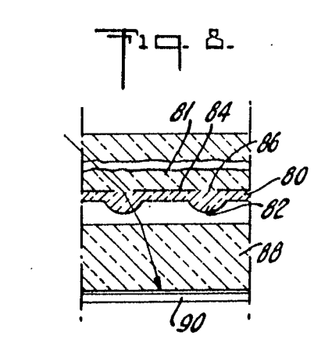
Figure 9:
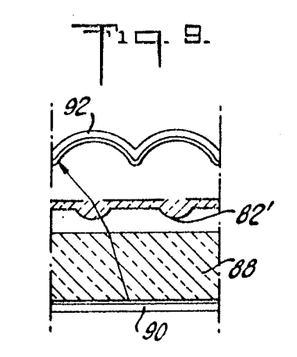
Figure 10:
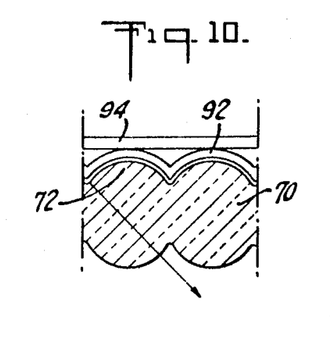

FIGURES 8, 9 and 10 illustrate diagrammatically a simplified showing of a modification of the invention in which the initial exposure is formed on flat film, while the film to be viewed is embossed. The masks and other accessory elements are not shown in these figures, but will be described and shown with respect to FIGURES 11, 12 and 13.

As shown, there is provided an integral sheet 80 having formed thereon a large number of uniform, evenly spaced plano-convex lenslets 82 which may be arranged in a hexagonal honeycomb pattern, or may be in a square pattern.

Sheet 80 is supported on a relatively thick layer of a rigid transparent material, such as plate glass 81. Rays of light are shown diagrammatically, the presence of the glass plate 81 being disregarded.

On the planar face 84 which is disposed towards the object to be photographed, the sheet 80 is provided with an opaque layer in which are formed diaphragm apertures 86, one for each of the lenslets 82 and properly registered with the axis of each of the lenslets 82 and their nodal point.

Sheet 80 is spaced from a support sheet of transparent material 88, such as polyester resin, having parallel faces which serves as the support for a sheet of radiation sensitive film 90 in contact with the face of sheet 88 opposite the lenslets 82 and at the focal plane of said lenslets 82.

After exposure the film 90 is processed and restored to a position with its emulsion side against the back face of sheet 88 or an identical sheet placed relative to the principal or nodal plane and nodal points of a new network, all as shown in FIGURE 9, a position corresponding exactly to the position of the original sheet 88 relative to the principal or nodal plane and nodal points of the first network. The new network has diaphragm positioned like those of the first network. On the side of the new network opposite the film 90, there is supported a layer of unexposed, embossed film 92, having its emulsion layer turned towards the lenslets 82' and in axial register therewith, the surface of the film 92 having spherical concavities. The two films lie close to conjugate surfaces, so that the images on film 90 are focussed as sharply as possible on the emulsion surface of film 92. With the parts in this position, film 92 is exposed, the light passing from film 90 through lenslets 82' to the emulsion surface of film 92. The exposed film is then processed and dried and placed in contact with the registering lenslets 72 of an integral lenticular network sheet 70 which may be the same as sheet 70 in FIGURE 7, depending on the refractive index and provided the relationship between its principal or nodal plane and film 92 is proportionate, relative to the pitch of film 92, to the relationship between the principal plane of the network of FIGURE 9 and film 92 during exposure.

During this exposure, the film is conveniently held accurately in its proper position by means of a vacuum back (not shown) which has concavities or perforations complementary to the convex elements of the rear face of film 92.

When the processed film 92 is viewed binocularly through the lenslets 72 of the integral lenticular network sheet 70, the summation image thus produced is orthoscopic and orthostereoscopic and encompasses a sufficiently wide angle for the viewed assembly not to present the distracting and undesirable effects of "jump-back" or repeat images, and instead to present in both horizontal and vertical directions a constant change of aspect depending upon the viewing angle.

For viewing, the secondary image film 92 positioned against the lenticular sheet 70 is preferably provided, on the side to be illuminated, with a translucent light-diffusing sheet 94, such as a sheet of opal or ground glass, or a sheet of matte plastic.

Figure 11:
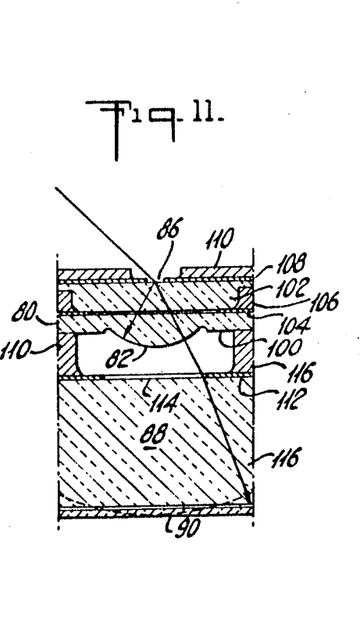
FIGURES 11, 12 and 13 are fragmentary but non-schematic cross sectional views of the embodiment shown in FIGURES 8, 9 and 10.

FIGURES 11 to 13 show an elaboration of the embodiment shown in FIGURES 8, 9 and 10. As shown, the integral lenticular network sheet 80 of polyester resin, polystyrene or other transparent material is formed with a large number of regularly spaced identical lenslets 82, preferably arranged in a hexagonal pattern, which lenslets are plano-convex and are provided with substantially flat areas 100 between the lenslets. In the sheet 80 is embedded reinforcing metallic network or screen preferably comprising a perforated sheet of nickel 104 and a thicker perforated sheet of copper 106 adherent thereon. The apertures in the sheets 104 and 106 are relatively large and are centered on and in register with the axes of the lenslets 82. On the external face of sheet 102 is a diaphragm sheet formed of a nickel plated thin copper sheet having a minute aperture in the nickel layer 108 and larger apertures 110 in the external face thereof, the small apertures being spaced in register with optical axes of the lenslets 82 and centered thereon, and lying in the principal or nodal plane of the lenslets.

On the side of the network 80 away from the scene, there is provided an apertured masking network sheet 110 which again comprises a nickel plated copper sheet of appropriate thickness. The relatively thin nickel sheet 112 is apertured with relatively large apertures 114 and the copper network sheet 116 is provided with larger apertures. The apertures 114 are in register with and centered on the optical axes of the lenslets 82, and the size of the apertures 114 is such that the images formed by the lenslets 82 at their focal plane or surfaces do not overlap each other, as shown by the arrow line representing the path of a light ray through the lenslet at the extreme edge of its field. Where the lenslets 82 are hexagonally packed, the apertures 114 are preferably of hexagonal shape.

In contact with the masking sheet 110 is a relatively thin layer of glass or preferably transparent plastic 116 at the rear face of which is pressed a flat sheet of radiation sensitive film 90, the emulsion side of the film being against the rear face of the transparent layer 116. The thickness of the layer 116 is such that the film 90 lies at approximately the focal surface of the lenslets 82. After exposure, the film is processed and dried and transferred in register to the assembly shown in FIGURE 12 which may be primarily similar to the assembly shown in FIGURE 11, but with the lenslets 82' of smaller radius.

Figure 12:
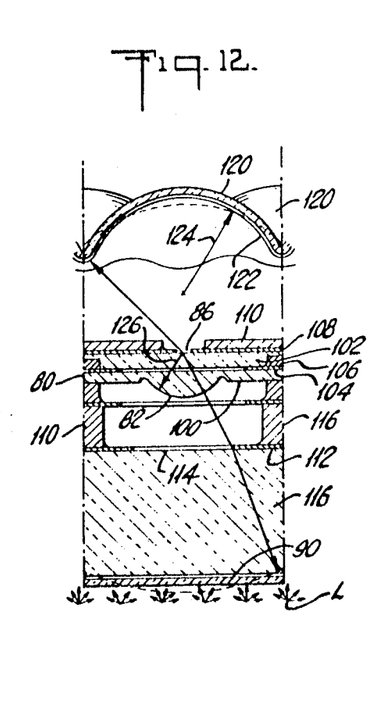

On the side nearest the diaphragm sheet 108, 110 and spaced therefrom to lie at a conjugate surface of the lenslets 82 is mounted in register an unexposed embossed film 120 having its concavities facing the diaphragm sheet, the embossings having the same pitch as the spacing of the lenslets 82, and the concavities being formed to correspond to the best compromise second conjugate surface of the lenslets 82 so that the image formed by each lenslet is as sharp as possible over the inner or emulsion face 122 of the film. The film 120 is preferably held in this spaced position by means of a complementary shaped or perforated vacuum back (not shown) into the concavities of which the embossed film is fitted.

Due to the fact that the film 90 in FIGURE 11 lies at substantially the focal surface of the lenslets 82 the objects to be photographed being at a relatively large distance which may be assimilated to infinity, the thickness of the elements is such that the convex surface of the lenslets 82 lies closer to the clear plastic layer 116 and more closely to the film 90 in FIGURE 11 than in FIGURE 12 while the layer 116 and the film are in both figures respectively at the same distance, relative to the pitch, from the principal planes of the networks. In FIGURE 12 it will be noticed that the plane of film 90 and the surface of film 120, 122 are at substantially the conjugate surfaces of the lenslet 82. Arrow 124 shows the radius of curvature of the concave face of a portion of the film 120, 122, while arrow 126 shows the radius of curvature from its nodal point of the lenslet 82. In FIGURE 12, the radius of curvature 126 of lenslets 82 is smaller than that of lenslets 82 of FIGURE 11. Hence, since the distance from the principal plane to the film 90 is equal in both figures, an additional spacer metal sheet 105, with or without a nickel layer 107, is provided between lenticular sheet 80, 102 and metal masking sheet 111.

For exposing the film 120, film 90 is illuminated from behind, preferably by diffuse light L, after which the film 120 is removed, processed and dried.

Figure 13:
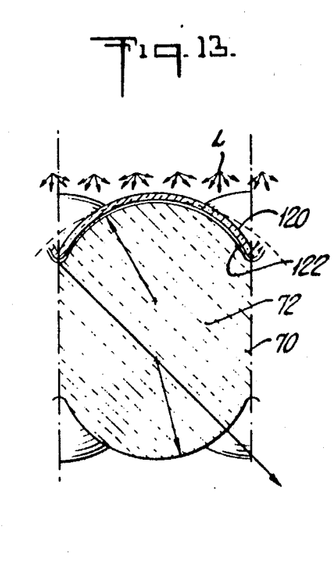

For viewing, the positive film 120, 122 bearing the many paralactically different images, is positioned in register with the lenslets 72 of an integral lenticular network sheet 70 and in full contact therewith and the film is illuminated by diffuse light as indicated at L, and is viewed binocularly with the observer looking through the lenslets 72 towards the light source.

As the viewing angle changes, the observer will see different stereoscopic views of the same scene. If the photograph is of a person's head, tilting the integral photograph with its lenticular network 70 enables the viewer to see the top of the subject's head, or the underside of the chin, while if the integral photograph is angularly moved about a vertical axis, the observer may see from a full face to a profile, and even further for angles exceeding 90°.

Figure 14:
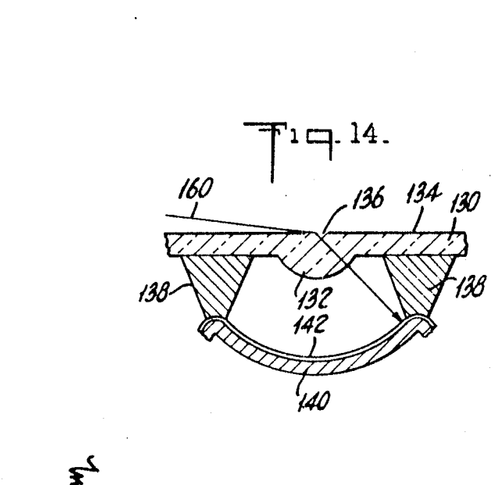
Figure 15:
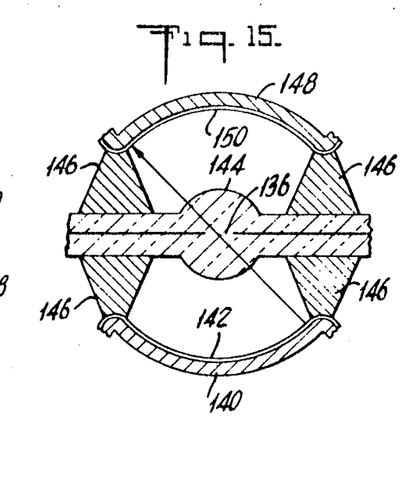
Figure 16:
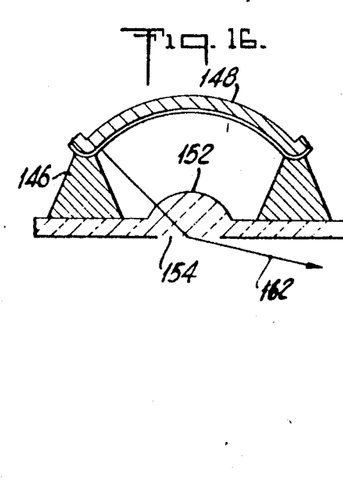

FIGURES 14, 15 and 16 show a further modification of the instrumentalities which may be employed in the practice of the present invention. FIGURE 14 represents the picture taking stage, FIGURE 15 the transposition stage and FIGURE 16 the viewing stage.

As shown in FIGURE 14, there is provided an integral lenticular network sheet 130 which is a plane on the surface facing the subject or scene to be photographed. Spaced on a regular hexagonal pattern on the opposite face of the sheet 130 are formed a large number of partispherical lenslets 132. On the plano face of sheet 130 is an opaque layer 134 having diaphragm apertures 136 in register with and centered on the axes and the centers of lenslets 132 which serve to limit the light passed by the lenslets and also to give better definition of the image. On the rear face of the lenticular sheet 130 is provided a masking and film supporting sheets 138 voids of which are substantially hexagonal in lateral section, widening away from the rear face of the lenticular sheet 130. This sheet 138 is preferably made of metal or opaque plastic so as to prevent the merging of the images formed by adjacent lenslets 132.

Supported on the elements 138 and properly spaced from the nodal points of the lenslets 132 is an embossed sheet of sensitive film 140 having a radiation sensitive emulsion layer 142. The spherically concave surfaces of the emulsion 142 are located at the focal surfaces of the lenslets 132.

In the position shown by FIGURE 14, the sensitive film 140, 142 is exposed to the scene to be photographed, after which it is appropriately processed.

In the transposition stage, the exposed and developed film 140, 142 is positioned as shown in FIGURE 15 with respect to a bi-convex lenslet 144 with an internal diaphragm aperture 136 which has on its far sides other masking and supporting elements 146 which serve to support the spherically embossed film 148, 150 so that its unexposed emulsion surface 150 lies at a conjugate surface of the lenslet 144, with the exposed and developed film 140, 142 at the other conjugate surface.

FIGURE 16 schematically illustrates the arrangement of parts for viewing the orthoscopic integral photograph. As shown the processed film 148, 150 is positioned and supported by support sheet 146 on one side of a planoconvex lens 152 consituting a single element of a lenticular network sheet 154, and in that position is adapted to be view from the plano side of the lenticular sheet 154, being preferably illuminated by diffuse light passing through the embossed film 148, 150. This viewing sheet is also provided with diaphragms at its principal or nodal plane. These diaphragms, however, are larger. Their diameter is preferably dictated by the critical angle or angle of total reflection.

On FIGURES 14 and 16 are shown ray arrows 160 and 162. To a certain extent during the initial photographic recording of the scene, objects even at the extreme angle of the arrow 160 are recorded on the film 140, 142, in the manner of a "fish-eye" lens. Likewise, in viewing, the stereoscopic image may be seen to a limited extent from viewing angles even as extreme as shown by the ray arrow 162 in FIGURE 16, or near 180°.

The stereoscopic summation images of the present invention exhibit stereoscopic relief even when viewed by persons having monocular vision, due to time parallax caused when the field of vision is changed either by movement of the head or by lateral or angular translation of the recorded image-lenticular network assembly.

While the invention has been generally described with reference to film for transillumination, it is to be understood that reflection prints are also within the scope of the invention. The image is then on an opaque white and/or highly reflectant film base rather than on a transparent film base.

Figure 17:
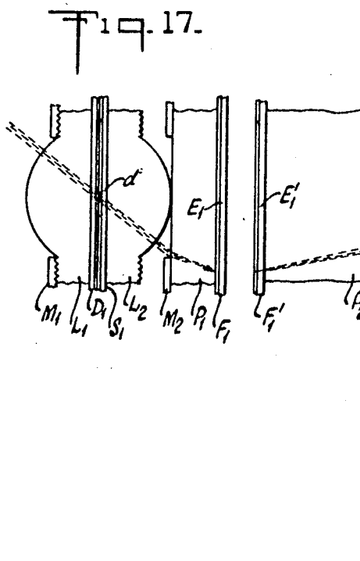
Figure 18:
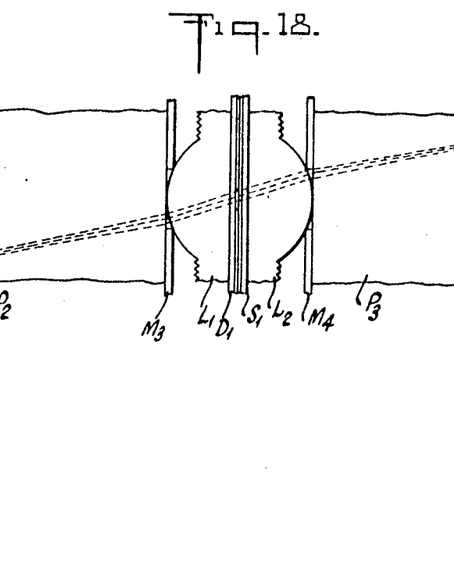
Figure 19:
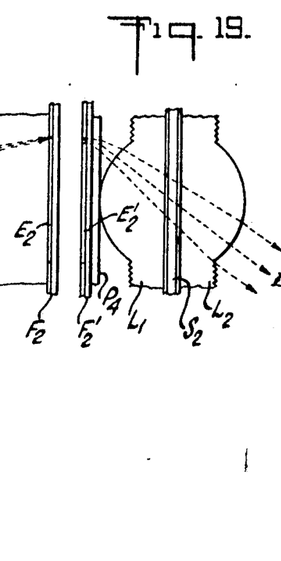

Referring now to FIGURES 17, 18 and 19 there are illustrated successively the taking stage, the transposition stage and the viewing stage for a further practical embodiment of the invention employing similarly or identically shaped image-forming elements at all three stages. In FIGURES 17, 18 and 19, the reference letter D refers to diaphragm layers, F to photo-sensitive films, L to lens plates, M to masks, S to spacers, and P to plane parallel plates.

In FIGURES 17, 18 and 19 the various transparent elements L, F, S, P have not been shown with section lines to indicate transparent plastic. To provide such section lines would confuse the showing of the sectional views in the drawings.

A mask $M_1$ on the front of lens member $L_1$, covers the interstices between the lenses. An opaque sheet $D_1$ having openings forming diaphragms therein, preferably hexagonal, is secured preferably in optical contact between the two lens members $L_1$ and $L_2$, so that the lenses and the openings are concentric. A spacing member $S_1$ may be placed preferably in optical contact and on the emulsion side of film $D_1$. A second mask $M_2$ is placed on the rear side of lens member $L_2$ to limit the field angle and to preclude any overlapping of the minute images. In the focal plane is then placed the unexposed photosensitive material having an emulsion $E_1$ and a base $F_1$.

The exposed and developed film is transferred to the transposition stage, FIGURE 18, where it is placed over the front of the plate $P_2$ in a conjugate plane of the lenslet sheet $L_1$, $L_2$, which may be the same one used in taking or a similar one, and is secured coaxially between plates $P_2$ and $P_3$. As in the taking plate, an opaque layer $D_1$ bearing the apertures or diaphragms, is provided between the lenslets of sheets $L_1$ and $L_2$. Similarly, a transparent spacing element $S_1$ may be provided. A field-limiting mask $M_3$ is provided between sheet $L_1$ and the film $F'_1$, either on the back of or as a part of and within the plate $P_2$.

Another mask $M_4$ may be provided on the rear side of the sheet $L_2$, on or within a plate $P_3$. An unexposed film $F_2$ is placed with its emulsion $E_2$ at the other conjugate plane of sheet $L_1$, $L_2$, against the rear plane of plate $P_3$. Once exposed, developed and dried, the film $F_2$ is ready for the viewing stage (where it is designated $F'_2$ and $E'_2$). In the viewing stage, FIGURE 19, it is placed against the plate $P_4$ at or closer than the focal plane of the lenslet sheet $L_1$, $L_2$. A transparent spacer $S_2$ may be provided within the lenslet sheet $L_1$, and $L_2$. Minute images and lenses are, of course, once more placed coaxially and in the same pattern and orientation.

With respect to all forms of the invention in FIGURES 1 to 16, if it is desired to reduce or enlarge the summation image on film 28, it may be reproduced on similarly embossed film having a correspondingly smaller or larger pitch for the spacing of the embossments of the copy film. This requires the use of a small aperture copying lens of long focal length (preferably operating at less than about 20°), so as to give proper depth of field and focus and minimum distortion. The film reproduction is then processed and mounted on the face of a new lenticular network sheet 20 of corresponding pitch and size in register with its lenslets.

Similarly, the first film, 54 or 90 of FIGURES 5 and 11, may be enlarged or reduced on a correspondingly larger or smaller film, the images of the new film are then transposed using a lenticular network of the appropriate pitch to produce the film to be viewed through a lenticular network of appropriate pitch. Likewise, images on flat film E, F, may be enlarged or reduced, and this is of special usefulness where large reproductions are to be made, as for example on billboards.

As used herein, the term "wide angle" means more than 60°, and preferably 90° to 120° or more.

What is claimed is:

1. In a method of integral photography, the improvement comprising in combination, the steps of positioning a first integral lenticular network having at its focal surface a first radiation-sensitive layer, of recording on said first layer the elemental images formed by the lenslets of said network when exposed to a scene, said elemental images being mutually parallactically different, their ensemble being thereby capable after development, of projecting in space a summation real-image which is a three dimensional but pseudoscopic duplicate of said scene, then positioning a second integral lenticular network arranged so as to have said developed first layer at one of a pair of conjugate surfaces, with said recorded elemental images in register with the lenslets of said second network, and a second radiation-sensitive layer at the other conjugate surface so as to record in focus one inverted elemental image for each one of the elemental images of the first exposed layer one of said networks having diaphragms and one of said networks having field-limiting means, of transferring said second layer, after development, in register with and onto a third integral lenticular network, said second layer lying approximately on and not further than the focal surface of said third network whereby, when suitably illuminated, said second layer and last network form a summation virtual image of said scene which is three dimensional and orthoscopic and is directly visible in the virtual space beyond and through said third network.

2. A system as defined in claim 1 in which said first network is provided with a diaphragm sheet located in the principal or nodal plane of said first network's lenslets.

3. A system as defined in claim 1 in which said second network includes a diaphragm sheet located in the principal or nodal plane of said second network's lenslets.

4. A system as defined in claim 1 in which the viewing angle of said virtual three dimensional orthoscopic summation image is substantially equal to the angle formed by said scene at the nodal points of the lenslets of said first network.

5. A system as defined in claim 1 in which the geometric relation between said first and second layer and said second network is such that, when said second layer is, after development, optically associated with said third network, the rays of light from said second layer's elemental images form, beyond the nodal points of said third network and towards the observer, substantially the same angles as were initially formed by the rays from said scene at the nodal points of the lenslets of said first network.

6. A system as defined in claim 1 in which the conjugate surfaces of said second network are in such relationship, first, that the distance between said first layer and said second network's principal or nodal plane is in the same relation to said second network's lenslet pitch as was the distance between the first layer and said first network's principal or nodal plane to said first network's lenslet pitch and, second, that the distance between said second layer and said second network's principal or nodal plane is in the same relation to said network's lenslet pitch as the distance between said second layer and said third network's principal or nodal plane to said third network's lenslet pitch, and, third, that the rays from said second layer's elemental images form after passing through the nodal points of said third network, and towards the observer, an angle substantially equal to the acceptance angle of said first network.

7. In a system as defined in claim 1, the steps of changing the size of the images of said first layer and their pitch, maintaining their initial relationship so as to form a different first layer which is used with proportionally changed second and third networks and second layer.

8. In a system as defined in claim 1, the steps of changing the size of the images of said second layer and their pitch, maintaining their initial relationship so as to form a different second layer which is used with a proportionally changed third network.

(References on following page)

References Cited

UNITED STATES PATENTS

| | | |
|---|---|---|
| 1,905,716 | 4/1933 | Ives. |
| 2,063,985 | 12/1936 | Coffey. |
| 2,622,472 | 12/1952 | Bonnet. |
| 2,833,176 | 5/1958 | Ossoinak. |

FOREIGN PATENTS 101,707 8/1937 Australia.

JOHN M. HORAN, Primary Examiner

U.S. Cl. X.R.

355—77, 132

UNITED STATES PATENT OFFICE
CERTIFICATE OF CORRECTION

Patent No. 3,503,315        Dated   March 31,1970

Inventor(s)   Roger Lannes de Montebello

It is certified that error appears in the above-identified patent and that said Letters Patent are hereby corrected as shown below:

In the heading of the specification delete the reference to the assignment of the patent to Joseph Lucas Industries.

Signed and sealed this 27th day of November 1973.

(SEAL)
Attest:

EDWARD M.FLETCHER,JR.                RENE D. TEGTMEYER
Attesting Officer                    Acting Commissioner of Patents